(12) United States Patent
Khan et al.

(10) Patent No.: US 12,432,547 B2
(45) Date of Patent: Sep. 30, 2025

(54) SYSTEMS AND METHODS FOR SUPPORTING MULTIPLE UNIVERSAL SUBSCRIBER IDENTITY MODULES

(71) Applicant: Verizon Patent and Licensing Inc., Basking Ridge, NJ (US)

(72) Inventors: Taussif Khan, Martinsville, NJ (US); Mary Williams, Miltona, MN (US); Alexandre De Melo, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 591 days.

(21) Appl. No.: 17/670,631

(22) Filed: Feb. 14, 2022

(65) Prior Publication Data
US 2023/0262444 A1 Aug. 17, 2023

(51) Int. Cl.
| | | |
|---|---|---|
| H04B 1/38 | (2015.01) |
| H04W 8/18 | (2009.01) |
| H04W 48/18 | (2009.01) |
| H04W 60/00 | (2009.01) |
| H04W 60/04 | (2009.01) |
| H04W 72/56 | (2023.01) |
| H04W 88/06 | (2009.01) |

(52) U.S. Cl.
CPC ........... *H04W 8/183* (2013.01); *H04W 48/18* (2013.01); *H04W 60/005* (2013.01); *H04W 60/04* (2013.01); *H04W 72/56* (2023.01); *H04W 88/06* (2013.01)

(58) Field of Classification Search
CPC ... H04W 60/005; H04W 60/04; H04W 88/06; H04W 12/06; H04W 12/062
See application file for complete search history.

(56) References Cited

U.S. PATENT DOCUMENTS

| | | | | |
|---|---|---|---|---|
| 2011/0269503 | A1* | 11/2011 | Park | H04W 8/183 |
| | | | | 455/552.1 |
| 2012/0275321 | A1* | 11/2012 | Ruvalcaba | H04W 4/60 |
| | | | | 370/252 |
| 2014/0073375 | A1* | 3/2014 | Li | H04W 12/069 |
| | | | | 455/558 |
| 2017/0094501 | A1* | 3/2017 | Huang-Fu | H04W 8/183 |
| 2017/0353939 | A1* | 12/2017 | Behera | H04W 76/18 |
| 2019/0166484 | A1* | 5/2019 | Chauhan | H04W 64/00 |
| 2021/0368327 | A1* | 11/2021 | Gao | H04W 24/08 |
| 2021/0392574 | A1* | 12/2021 | Tiwari | H04W 76/10 |
| 2022/0225093 | A1* | 7/2022 | Sasi | H04W 12/06 |
| 2022/0232364 | A1* | 7/2022 | Tsuda | H04W 8/183 |
| 2023/0010391 | A1* | 1/2023 | Prakash | H04W 76/25 |
| 2023/0014016 | A1* | 1/2023 | Qi | H04L 65/80 |
| 2023/0276223 | A1* | 8/2023 | Shaheen | H04W 8/183 |
| | | | | 455/435.1 |

* cited by examiner

*Primary Examiner* — Shantell L Heiber

(57) ABSTRACT

A user equipment (UE), comprising at least one processor may be configured to transmit a first attach request to a first wireless network based on a first universal subscriber identity module (USIM). The UE may receive a rejection from the first wireless network and may switch from the first USIM to a second USIM based on the rejection. The UE may transmit a second attach request to the first wireless network based on the second USIM.

20 Claims, 6 Drawing Sheets

SYSTEMS AND METHODS FOR SUPPORTING MULTIPLE UNIVERSAL SUBSCRIBER IDENTITY MODULES

BACKGROUND INFORMATION

Modern smart phones may be capable of accessing more than one wireless network (e.g., cellular networks). For example, each wireless network may be a public land mobile network (PLMN) or a private mobile network. To enable subscriber secure access to each wireless network, an access control scheme is required. As an example, an access control scheme may verify an identity of the smart phone and may grant a level of access commensurate with the verified identity. Such access control is governed by an access control client, generally referred to as a Universal Subscriber Identity Module (USIM) that executes on a physical Universal Integrated Circuit Card (UICC) (also referred to as a "SIM card"). The USIM access control client (also referred to as an "application") authenticates the subscriber to the wireless network and, after successful authentication, allows access to the wireless network.

DETAILED DESCRIPTION OF EXAMPLE EMBODIMENTS

The following detailed description refers to the accompanying drawings. The same reference numbers in different drawings may identify the same or similar elements. As used herein, the term Universal Subscriber Identity Module (USIM) may not only refer to an access control client, but may be generally understood to correspond to any SIM-like application executing or a physical or logical device, such as a Universal Integrated Circuit Card (UICC), for use in authenticating a user on one or more wireless networks.

The systems and methods described herein relate to allowing a user of a mobile device that includes only a single UICC for the mobile device, to efficiently access multiple wireless networks using two or more dedicated USIM components. For example, assume that a mobile device (e.g., a smart phone) subscribes to both a first wireless network (e.g., a private long term evolution (LTE) or fifth generation (5G) wireless network) and a second wireless network (e.g., a Public Land Mobile Network (PLMN)). To secure access to the first wireless network, the UICC of the mobile device includes a first USIM and to secure access to the second wireless network, the UICC of the mobile device includes a second USIM.

For example, assume that a provider of wireless network services (e.g., communication services) operates both the private wireless network and the (PLMN. Furthermore, assume that at least a subset of subscribers of the two wireless networks use mobile devices that have only a single UICC. The systems and methods described herein permit the subscribers to efficiently switch between the private wireless network and the public PLMN based on a priority of the wireless networks and the relative availability of each wireless network.

Consistent with implementations described herein, a single UICC or embedded UICC (eUICC) may be provisioned with two unique sets of subscriber credentials (also referred to as subscription credentials) as respective USIMs on the UICC. The systems and methods allow the subscriber to use the USIM for the private wireless network when the private wireless network is available and to switch and use the USIM for the public PLMN when the private wireless network is not available.

Figure 1A:
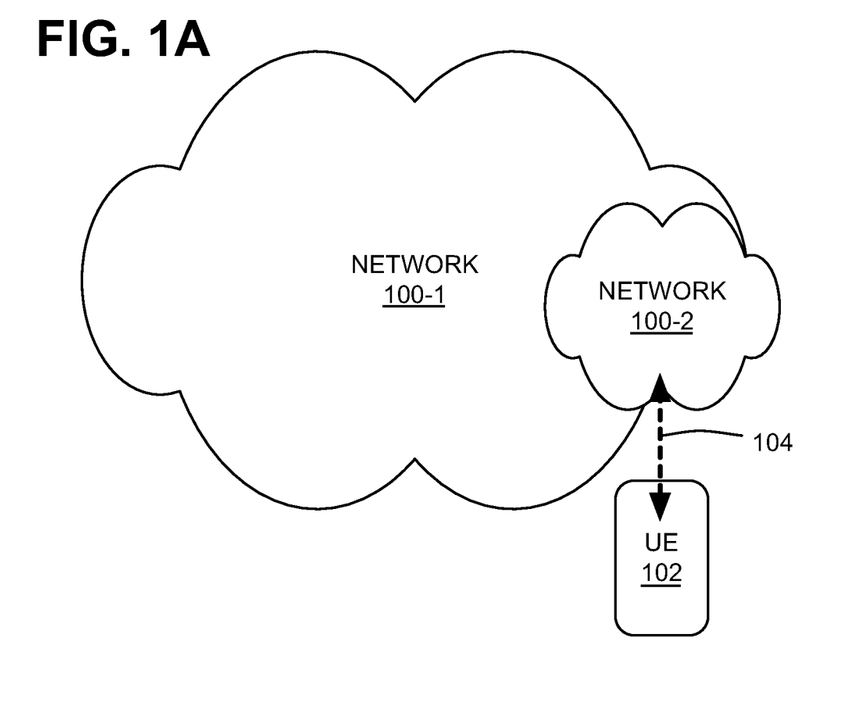
FIGS. 1A and 1B illustrate concepts described herein.
Figure 1B:
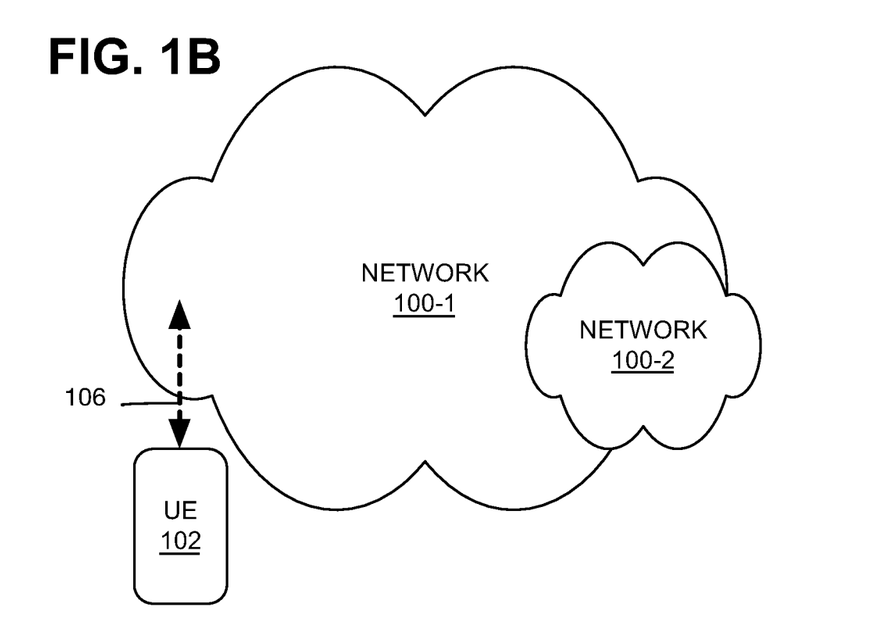

FIGS. 1A and 1B illustrate different ways in which the systems and methods described herein permit a user equipment device (UE) 102 (e.g., a mobile device such as a smart phone) to access a first wireless network 100-1 that includes a coverage area that encompasses or overlaps at least a portion of the coverage area of a second wireless network 100-2. Although only two wireless networks are shown in FIGS. 1A and 1B, in practice, UE 102 may access more than two wireless networks in a similar manner. For FIGS. 1A and 1B, assume that UE 102 includes a single UICC that stores two (or more) USIMs that include a respective two or more sets of subscriber credentials for respectively attaching to wireless networks 100-1 and 100-2. Consistent with embodiments described herein, wireless networks 100-1 and 100-2 may have a business relationship such that it is desirable to give subscribers of second wireless network 100-2 the ability to access first wireless network 100-1 when second wireless network 100-2 is not available or suffers from quality or performance issues.

As shown in FIG. 1A, UE 102 may attach to wireless network 100-2 (e.g., a private wireless network, such as a LTE or 5G wireless network) using the first set of USIM subscriber credentials associated with network 100-2 and establish a signal and/or data path (104) with network 100-2. As shown in FIG. 1B, after UE 102 attaches to wireless network 100-2, UE 102 may attach (106) to another wireless network, such as wireless network 100-1 (e.g., a PLMN) using the second set USIM subscriber credentials associated with network 100-1 and establish a signal and/or data path (106) with network 100-1.

Figure 2A:
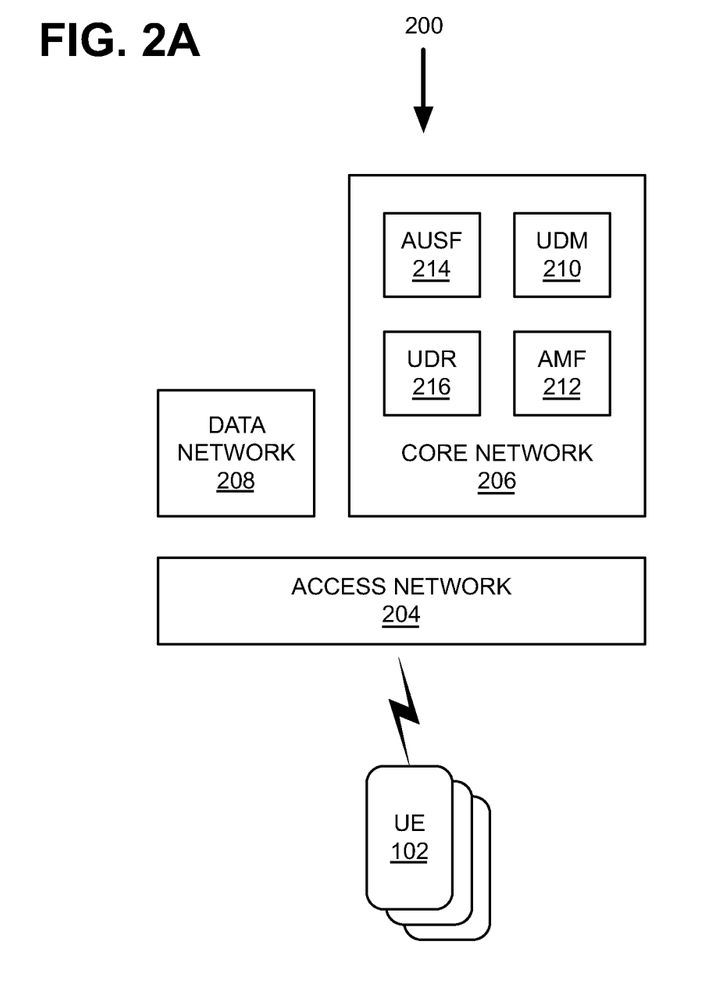
FIG. 2A illustrates an example network in which the systems and methods described herein may be implemented.

FIG. 2A illustrates an example network 200 according to an implementation. Network 200 may be configured and implemented as wireless network 100-1, wireless network 100-2, or another wireless network (e.g., a different private wireless network, PLMN, etc.). As shown, network 200 may include UEs 102 (individually and generically referred to as UE 102 and collectively as UEs 102), an access network 204, a core network 206, and a data network 208. UE 102 may include, for example, a wireless communication device, a mobile terminal, or a fixed wireless access (FWA) device. Examples of UE 102 include: a smart phone; a tablet device; a wearable computer device (e.g., a smart watch); a laptop computer; an autonomous vehicle with communication capabilities; a portable gaming system; and an Internet-of-Thing (IoT) device.

In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 102 may send packets to or over access network 204. UE 102 may have the capability to select a particular network slice from which UE 102 can request a service. UE 102 may have the capability to connect to different Radio Access Technology (RAT) access devices, such as LTE or 5G base stations.

As discussed above, UE 102 may include at a UICC having at least two Universal Subscriber Identity Modules (USIMs) stored thereon. Furthermore, to enable UE 102 to access multiple networks, such as in the scenarios depicted in FIGS. 1A and 1B, the UICC may also include additional processing capabilities relating to switching between the different USIMs, such as one or more additional applications executing on the UICC.

Access network 204 may allow UE 102 to access core network 206. To do so, access network 204 may establish and maintain, with participation from UE 102, an over-the-air channel with UE 102; and maintain backhaul channels (not shown) with core network 206. Access network 204 may convey information through these channels, from UE 102 to core network 206 and vice versa.

Access network 204 may include an LTE radio network, a Next Generation (NG) radio access network (e.g., 5G radio access network) and/or another advanced radio network. These radio networks may operate in many different frequency ranges, including millimeter wave (mmWave) frequencies, sub 6 GHz frequencies, and/or other frequencies. Access network 204 may include many wireless stations, Central Units (CUs), Distributed Units (DUs), Radio Units (RUs), and Integrated Access and Backhaul (IAB) nodes. The wireless station, CUs, DUs, RUs, and/or IAB nodes may establish and maintain over-the-air channels with UEs 102 and backhaul channels with core network 206.

Core network 206 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, a PLMN, or a combination of networks. Core network 206 may allow the delivery of Internet Protocol (IP) services to UE 102 and may interface with other networks, such as data network 208.

Depending on the implementation, core network 206 may include 4G core network components (e.g., a Serving Gateway (SGW), a Packet data network Gateway (PGW), a Mobility Management Entity (MME), a Home Subscriber Server (HSS), an Authentication Authorization and Accounting (AAA) server, a Policy and Charging Rules Function (PCRF), etc.) and/or 5G core network components. As shown, the 5G core network components may include a Unified Data Management (UDM) 210, an Access and Mobility Management Function (AMF) 212, an Authentication Server Function (AUSF) 214, and a Unified Data Repository (UDR) 216. Although core network 206 may include other 5G core network components (or other 4G core network components), they are not shown in FIG. 2A for clarity.

UDM 210 may manage subscription information, handle user identification and authentication (together with AUSF 214) and perform access authorization. AMF 212 may perform registration management, connection management, reachability management, mobility management, and/or lawful intercepts. AUSF 214 may render authentication services and other security related services to other network components, such as UDM 210. UDR 216 may store subscriber information and/or other types of information. In some implementations, UDR 216 may store subscriber credentials and/or UDM credentials, which may be associated with a UDM. The UDM credentials may be used by UDM 210 or AUSF 214 to authenticate the UE.

Data network 208 may include networks that are external to core network 206. In some implementations, data network 208 may include packet data networks, such as an Internet Protocol (IP) network. In another implementation, data network 208 may be part of core network 206. Data network 208 may provide particular network services, such as, for example, Voice-over-IP (VoIP) services, messaging services, video services, etc.

For simplicity, FIG. 2A does not show all components that may be included in network 200 (e.g., routers, bridges, wireless access points, additional networks, additional UEs 102, wireless stations, IAB nodes, CUs, DUs, RUs, etc.). These components and the components described above may be connected to one another by either wireless links or physical links. Also, depending on the implementation, network 200 may include additional, fewer, different, or a different arrangement of components than those illustrated in FIG. 2A.

Figure 2B:
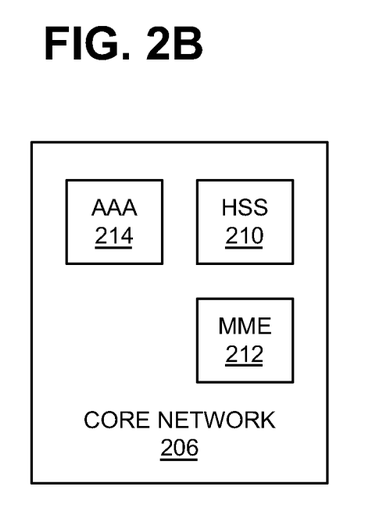
FIG. 2B illustrates an example core network according to an implementation.

For example, in some implementation (such as those shown in FIGS. 3 through 7), core network 206 of FIG. 2A may be substituted with a different type of core network 206, such as an evolved packet core (EPC) network. FIG. 2B illustrates a number of components of core network 206 when core network 206 is implemented as an EPC. As shown in FIG. 2B, core network 206 (or EPC) includes a HSS 210, an MME 212, and an AAA 214 may provide similar functionalities as UDM 210, AMF 212, AUSF 214, and may replace UDM 210, AMF 212, and AUSF 214. In some implementations, an HSS may also provide the functionalities of UDR 216 and may take the place of UDR 216. In implementations where an LTE core network (e.g., an EPC) is used in place a 5G core network, other networks (e.g., access network 204 or data network 208) may also be modified or configured differently to operate with the EPC. Consistent with implementations described herein, network wireless network 100-2 (e.g., a private wireless network) may be configured as a private LTE network that includes components similar to those described above in relation to FIG. 2B.

As explained above, the systems and methods described herein relate to allowing UE 102, which has only a single UICC, to access, in different ways (such as those shown in FIGS. 1A and 1B) multiple wireless networks 200 using unique sets of subscriber credentials (stored within the UICC as distinct USIMs). As described herein, the system is implemented by incorporating one or more components within UICC to facilitate switching between the distinct USIMs without requiring any modifications to the components of wireless networks 200.

Figure 3:
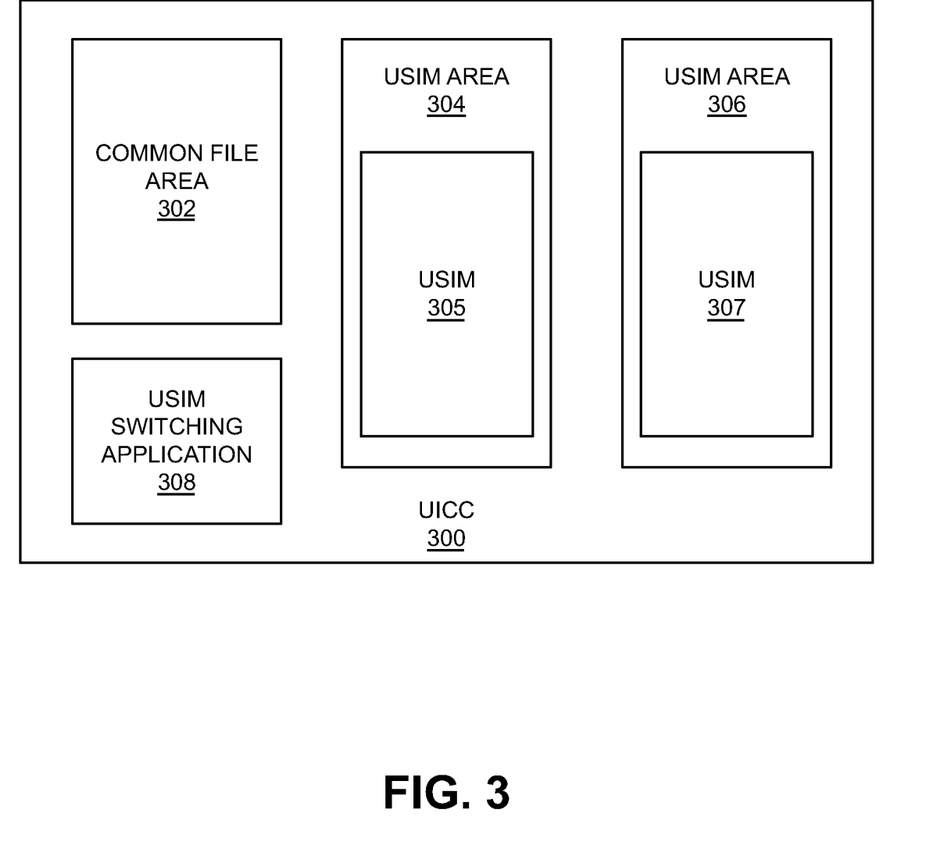
FIG. 3 is a block diagram illustrating exemplary components of a UICC consistent with implementations described herein illustrates example.

FIG. 3 is a block diagram illustrating exemplary components of UICC 300 consistent with implementations described herein. As shown, UICC 300 may include a common file area 302, a first USIM area 304, a second USIM area 306, and a USIM Switching application 308.

Common file area 302 may store elementary files (EFs) and directory files (DFs) for all profiles on UICC 300. For example, common file area 302 may include local and global phone books, a short message service (SMS) storage, and network selection instructions. Consistent with implementations described herein, the network selection instructions may include one or more elementary files that include a prioritized list of wireless networks to which UE 102 may connect. More specifically, the prioritized list may identify wireless network 100-2 (e.g., the private wireless network) as having a higher priority than wireless network 100-1 (e.g., the PLMN). Accordingly, when UE 102 determines that wireless network 100-2 is available, UE 102 may attempt to connect to wireless network 100-2, even when already connected to wireless network 100-1 or another wireless network.

Consistent with embodiments described herein, UICC 300 may include two USIMs 305 and 307, information for which is stored in areas 304 and 306, respectively. USIM 305 may be associated with second wireless network 100-2 (e.g., a private wireless network) and USIM 307 may be associated with first wireless network 100-1 (e.g., a PLMN). Each USIM 305/307 may include various elementary and directory file information for that respective USIM identity, including an International Mobile Subscriber Identity (IMSI), authentication keys, ciphering keys, integrity keys, etc.

USIM switching application 308 may execute on UICC 300 and may operate to change the active USIM in response to certain triggers identified during network attachment. For example, as described below, upon receipt of a particular messaging or signaling by UICC 300, USIM switching application 308 may execute to modify an active USIM on UICC 300 and may initiate a refresh of UE 102's network connection after the modification. For example, USIM switching application 308 may modify an active application ID from USIM 305 to USIM 307 or vice-versa, based on particular received signaling from UE 102.

Figure 4:
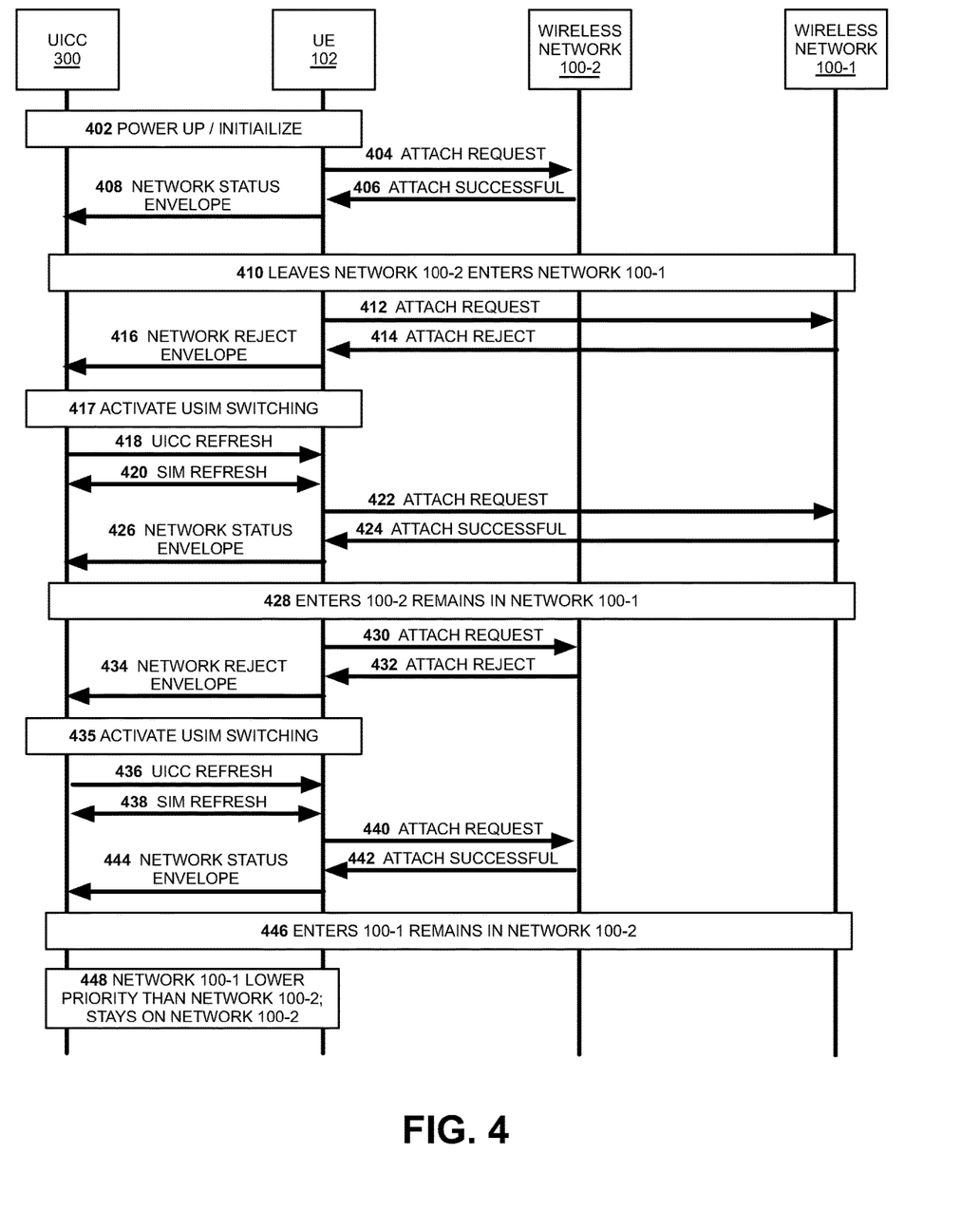
FIG. 4 is a signaling diagram of an example process for switching USIMs, according to an implementation.

FIG. 4 is a signaling diagram of an example process for modifying a wireless network consistent with implementations described herein. The process depicted in FIG. 4 contains functions performed by UE 102 (e.g., a modem or process of UE 102), UICC 300, wireless network 100-1, and wireless network 100-2. Each arrow and block in FIG. 4 may represent more than one signal, message, and/or process. Furthermore, FIG. 4 may not show every signal, message, and/or process that is associated with creating and or modifying an attachment to wireless networks 100. For the process, assume that UE 102 is moving within a geographical area covered by wireless network 100-1 and sometimes covered by wireless network 100-2.

As shown, the process may begin with UE 102 and UICC 300 powering on and initializing in preparation for connecting to a wireless network (block 402). For example, an application identifier (AID) in UICC 300 may be initially set to default USIM 305 and UE 102 may retrieve identification information (e.g., IMSI, etc.) based on the AID. Assume for the purposes of this description that UE 102 is initially present in a geographical area covered by wireless network 100-2 (e.g., a private wireless network).

Using the information from primary USIM 305, UE 102 sends an attach request message (404) to wireless network 100-2. For example, UE 102 may respond to broadcast signals from one of the wireless stations in wireless network 100-2, proceed through a random access channel (RACH) procedure, and establish a radio resource control (RRC) connection with the wireless station. After establishing the connection, UE 102 may transmit the attach request as a non-access stratum (NAS) message to the wireless station.

Assuming that the received information correctly identifies a subscriber to wireless network 100-2, wireless network 100-2 returns an attach successful message (406) to UE 102, which then forwards a corresponding status message (408) to UICC 300. In some implementations, UICC 300 may be configured to execute 3GPP TS 31.111, entitled "Universal Subscriber Identity Module (USIM), Application Toolkit (USAT)," which defines a set of commands and procedures for use during 3GPP network operation phase. In such an implementation, status message 408 may include a network status envelope message.

Next, assume that UE 102 moves to a geographic location which is no longer adequately covered by wireless network 100-2, but which is covered by wireless network 100-1 (block 410). UE 102 initially attempts to attach to wireless network 100-1 by sending an attach request message (412) to wireless network 100-1 using the information previously retrieved from primary USIM 305. Because the identity associated with USIM 305 is not associated with a subscriber of wireless network 100-1, wireless network 100-1 returns an attach reject message (414) indicating that the UE 102 has not been attached to wireless network 100-1. In response to receiving message 414, UE 102 forwards a reject message (416) to UICC 300. For implementations which utilize the USAT, as described above, message 416 may include a network reject envelope message.

Consistent with implementations described herein, upon receipt of reject message 416 from UE 102, UICC 300 may activate USIM switching application 308 to switch between primary USIM 305 to secondary USIM 307 (block 417). For example, USIM switching application 308 may modify the AID to USIM 307. UICC 300 may transmit a refresh message (418) to UE 102 instructing UE 102 to update its stored subscriber information. In response, UE 102 requests and receives (420) subscriber information from UICC 300 associated with USIM 307.

Using the information from USIM 307, UE 102 then sends an attach request message (422) to wireless network 100-1. Assuming that the received information correctly identifies a subscriber to wireless network 100-1, wireless network 100-1 returns an attach successful message (424) to UE 102, which then forwards a corresponding status message (426) (e.g., a network status envelope message) to UICC 300.

As described above, UICC 300 maintains a prioritized listing of wireless networks, for example, as part of common file area 302. Consistent with such a listing, when UE 102 identifies a new wireless network, UE 102 may determine, based on the information in UICC 300, whether the new network has a higher priority than a wireless network to which UE 102 is currently attached. Accordingly, returning to FIG. 4, UE 102, while attached to wireless network 100-1, may identify availability of wireless network 100-2 (block 428). In response, UE 102 may determine whether wireless network 100-2 has a higher priority than network 100-1. In the present example, wireless network 100-2 (e.g., the private wireless network) is the primary wireless network, or the wireless network having a highest priority.

Accordingly, based on this priority, UE 102 sends an attach request message (430) to wireless network 100-2 using the information currently associated with the AID, which is USIM 307. Because the identity associated with USIM 307 is not associated with a subscriber of wireless network 100-2, wireless network 100-2 returns an attach reject message (432) indicating that the UE 102 has not been attached to wireless network 100-2. In response to receiving message 432, UE 102 forwards a reject message (e.g., a network reject envelope message) (434) to UICC 300.

Upon receipt of reject message 434 from UE 102, UICC 300 activates USIM switching application 308 to switch between USIM 307 and primary USIM 305 (block 435). For example, USIM switching application 308 may modify the AID to USIM 305. Next, UICC 300 may transmit a refresh message (436) to UE 102 instructing UE 102 to update its stored subscriber information. In response, UE 302 requests and receives (438) subscriber information from UICC 300 associated with USIM 305.

Using the information from USIM 305, UE 102 sends an attach request message (440) to wireless network 100-2. Assuming that the received information correctly identifies a subscriber to wireless network 100-2, wireless network 100-2 returns an attach successful message (442) to UE 102, which then forwards a corresponding status message (444) (e.g., a network status envelope message) to UICC 300.

In a final example, assume that UE 102, while attached to wireless network 100-2, identifies availability of wireless network 100-1 (block 446). In response, UE 102 determines (block 448) that wireless network 100-1 (e.g., a PLMN) does not have a higher priority than network 100-2 (e.g., the private wireless network) and thus, remains attached to wireless network 100-2.

Although described generally above in terms of an implementation that includes UICC 300 and USIMs 305 and 307, features similar to those described above may be implemented using embedded UICCs (e.g., eUICCs) and eSIMs that implement a mobile network operator (MNO) profile.

Figure 5:
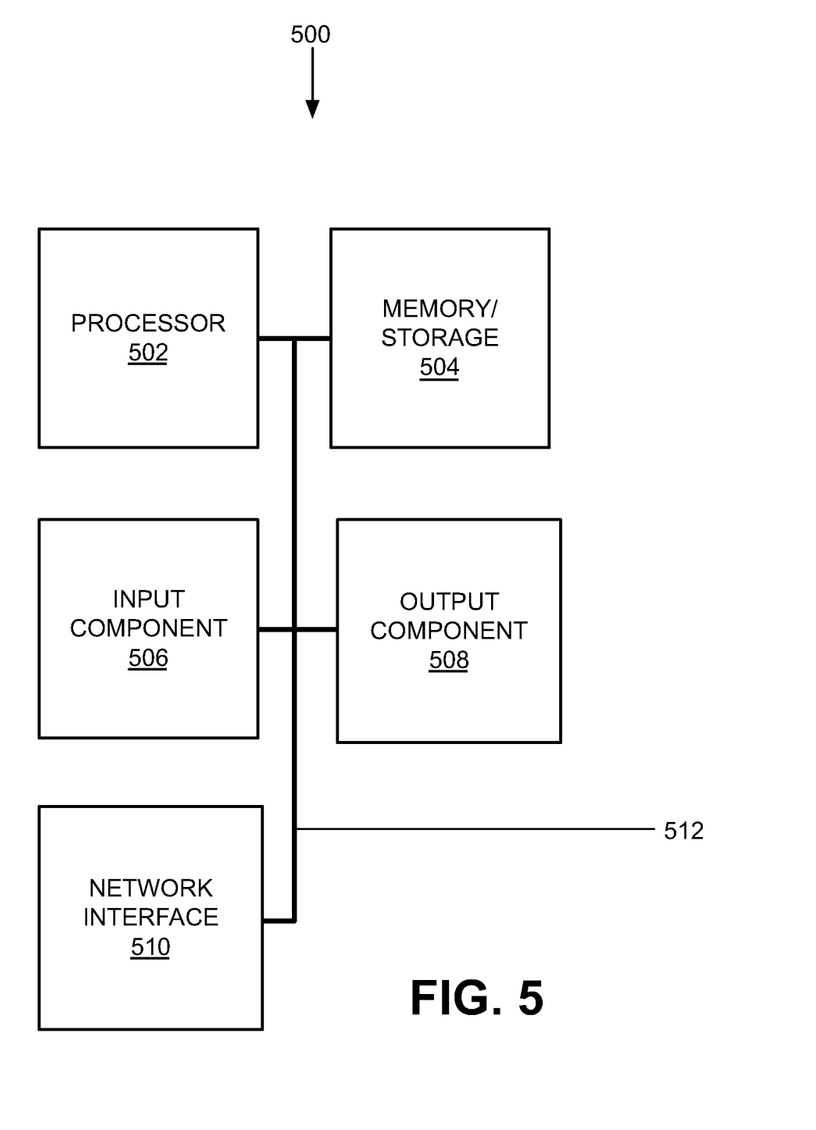
FIG. 5 depicts example components of a network device, according to an implementation.

FIG. 5 depicts example components of an example network device 500. Network device 500 corresponds to or is included in UE 102 and/or any of the network components of FIGS. 1-5 (e.g., a router, a network switch, servers, gateways, AMFs, UDMs, UDRs, AUSFs, AAAs, MMES, HSSs, etc.). As shown, network device 500 includes a processor 502, memory/storage 504, input component 506, output component 508, network interface 510, and communication path 512. In different implementations, network device 500 may include additional, fewer, different, or a different arrangement of components than the ones illustrated in FIG. 5. For example, network device 500 may include a display, network card, etc.

Processor 502 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 500 and/or executing programs/instructions.

Memory/storage 504 may include static memory, such as read only memory (ROM), and/or dynamic memory, such as random access memory (RAM), or onboard cache, for storing data and machine-readable instructions (e.g., programs, scripts, etc.).

Memory/storage 504 may also include a physical storage medium, such as an optical disc, a magnetic disk, a solid state disk, and/or flash memory, as well as other types of storage device (e.g., Micro-Electromechanical system (MEMS)-based storage medium) for storing data and/or machine-readable instructions (e.g., a program, script, etc.). Memory/storage 504 may be external to and/or removable from network device 500. Memory/storage 504 may include, for example, a Universal Serial Bus (USB) memory stick, a dongle, a hard disk, off-line storage, a Blu-Ray® disk (BD), etc. Memory/storage 504 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 506 and output component 508 may provide input and output from/to a user to/from network device 500. Input and output components 506 and 508 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 500.

Network interface 510 may include a transceiver (e.g., a transmitter and a receiver) for network device 500 to communicate with other devices and/or systems. For example, via network interface 510, network device 500 may communicate with wireless stations in wireless networks 100-1 and 100-2.

Network interface 510 may include an Ethernet interface to a LAN, and/or an interface/connection for connecting network device 500 to other devices (e.g., a Bluetooth interface). For example, network interface 510 may include a wireless modem for modulation and demodulation.

Communication path 512 may enable components of network device 500 to communicate with one another.

Network device 500 may perform the operations described herein in response to processor 502 executing software instructions stored in a non-transient computer-readable medium, such as memory/storage 504. The software instructions may be read into memory/storage 504 from another computer-readable medium or from another device via network interface 510. The software instructions stored in memory or storage (e.g., memory/storage 504, when executed by processor 502, may cause processor 502 to perform processes that are described herein. For example, UE 102, UICC 300, and components of networks 100-1 and 100-2 may each include various programs for performing some of the above-described functions and processes.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks and arrows have been described above with regard to the processes illustrated in FIG. 4 the order of the blocks and arrows may be modified in other implementations. In addition, non-dependent blocks and arrows may represent actions and messages that can be performed or exchanged in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A method comprising:
   transmitting, by a user equipment (UE), a first attach request to a first wireless network based on a first universal subscriber identity module (USIM);
   receiving, by the UE, a rejection from the first wireless network;
   automatically switching from the first USIM to a second USIM based on the rejection,
   wherein the first and second USIMs are stored on a common universal integrated circuit card (UICC) associated with the UE;
   transmitting, by the UE, a second attach request to the first wireless network based on the second USIM; and
   performing, by the UE, at least one of the following groups of actions:
      determining that the first wireless network is no longer available,
      determining that a second wireless network is available,
      transmitting a third attach request to the second wireless network based on the second USIM,
      receiving a rejection from the second wireless network,
      automatically switching from the second USIM to the first USIM based on the rejection, and
      transmitting a fourth attach request to the second wireless network based on the first USIM;
   or
      determining that a second wireless network is available,
      determining whether the second wireless network has a higher priority than the first wireless network,
      when the second wireless network has a higher priority than the first wireless network:
         transmitting a fifth attach request to the second wireless network based on the second USIM,
         receiving a rejection from the second wireless network,
         automatically switching from the second USIM to the first USIM based on the rejection, and
         transmitting a sixth attach request to the second wireless network based on the first USIM.

2. The method of claim 1, wherein switching from the first USIM to the second USIM comprises changing an application identifier (AID) associated with the UICC from the first USIM to the second USIM.

3. The method of claim 2, wherein the switching is performed by a switching application executing on the UICC.

4. The method of claim 1, further comprising:
   forwarding, by the UE, a rejection message to the UICC.

5. The method of claim 4, wherein the rejection message comprises a network reject envelope message.

6. The method of claim 1, wherein the first wireless network comprises a public land mobile network and wherein the second wireless network comprises a private wireless network.

7. The method of claim 6, wherein the second wireless network comprises a private long term evolution (LTE) or fifth generation (5G) mobile network.

8. The method of claim 6, wherein a coverage area of the public land mobile network overlaps a coverage area of the private wireless network.

9. A user equipment (UE), comprising at least one processor configured to:
   transmit a first attach request to a first wireless network based on a first universal subscriber identity module (USIM);
   receive a rejection from the first wireless network;
   automatically switch from the first USIM to a second USIM based on the rejection,
   wherein the first and second USIMs are stored on a common universal integrated circuit card (UICC) associated with the UE;
   transmit a second attach request to the first wireless network based on the second USIM; and
   wherein the at least one processor is further configured to perform at least one of the following groups of actions:
      determine that the first wireless network is no longer available,
      determine that a second wireless network is available,
      transmit a third attach request to the second wireless network based on the second USIM,
      receive a rejection from the second wireless network,
      automatically switch from the second USIM to the first USIM based on the rejection, and
      transmit a fourth attach request to the second wireless network based on the first USIM;
   or
      determine that a second wireless network is available,
      determine whether the second wireless network has a higher priority than the first wireless network,
      when the second wireless network has a higher priority than the first wireless network:
         transmit a fifth attach request to the second wireless network based on the second USIM,
         receive a rejection from the second wireless network,
         automatically switch from the second USIM to the first USIM based on the rejection, and
         transmit a sixth attach request to the second wireless network based on the first USIM.

10. The UE of claim 9, wherein the at least one processor configured to automatically switch from the first USIM to the second USIM based on the rejection comprises the UICC.

11. The UE of claim 10, wherein the at least one processor configured to switch from the first USIM to the second USIM based on the rejection comprises a switching application executing on the UICC.

12. The UE of claim 10, wherein the at least one processor is further configured to:
forward a rejection message to the UICC.

13. The UE of claim 9, wherein the first wireless network comprises a public land mobile network and wherein the second wireless network comprises a private wireless network.

14. The UE of claim 13, wherein a coverage area of the public land mobile network overlaps a coverage area of the private wireless network.

15. A non-transitory computer-readable medium comprising processor-executable instructions that, wherein when executed by a processor, cause the processor to:
transmit a first attach request to a first wireless network based on a first universal subscriber identity module (USIM);
receive a rejection from the first wireless network;
automatically switch from the first USIM to a second USIM based on the rejection,
wherein the first and second USIMs are stored on a common universal integrated circuit card (UICC) associated with a User Equipment (UE);
transmit a second attach request to the first wireless network based on the second USIM; and
wherein the instructions cause the processor to further perform at least one of the following groups of actions:
determine that the first wireless network is no longer available,
determine that a second wireless network is available,
transmit a third attach request to the second wireless network based on the second USIM,
receive a rejection from the second wireless network,
automatically switch from the second USIM to the first USIM based on the rejection, and
transmit a fourth attach request to the second wireless network based on the first USIM;
or determine that a second wireless network is available,
determine whether the second wireless network has a higher priority than the first wireless network,
when the second wireless network has a higher priority than the first wireless network:
transmit a fifth attach request to the second wireless network based on the second USIM,
receive a rejection from the second wireless network,
automatically switch from the second USIM to the first USIM based on the rejection, and
transmit a sixth attach request to the second wireless network based on the first USIM.

16. The non-transitory computer-readable medium of claim 15, wherein the processor-executable instructions that cause the processor to switch from the first USIM to the second USIM, further cause the processor to change an application identifier (AID) associated with the UICC from the first USIM to the second USIM.

17. The non-transitory computer-readable medium of claim 15, wherein the instructions that cause the processor to switch from the first USIM to the second USIM comprise instructions to:
change an application identifier (AID) associated with the UICC from the first USIM to the second USIM.

18. The non-transitory computer-readable medium of claim 17, wherein the switching is performed by a switching application executing on the UICC.

19. The non-transitory computer-readable medium of claim 15, wherein the first wireless network comprises a public land mobile network and wherein the second wireless network comprises a private wireless network.

20. The non-transitory computer-readable medium of claim 19, wherein a coverage area of the public land mobile network overlaps a coverage area of the private wireless network.

* * * * *